_US005761203A_

United States Patent [19]

Morales

[11] Patent Number: 5,761,203
[45] Date of Patent: Jun. 2, 1998

[54] SYNCHRONOUS AND ASYNCHRONOUS RECOVERY OF SIGNALS IN AN ATM NETWORK

[75] Inventor: Luis E. Morales, Freehold, N.J.

[73] Assignee: Lucent Technologies Inc., Murray Hill, N.J.

[21] Appl. No.: 628,174

[22] Filed: Apr. 4, 1996

[51] Int. Cl.[6] .................................................. H04L 7/00
[52] U.S. Cl. .................... 370/418; 370/507; 370/545
[58] Field of Search ........................... 370/503, 67, 505, 370/508, 506, 509, 512, 516, 517, 518, 545, 412, 415, 416, 417, 418, 465; 375/354, 371, 372, 374

[56] References Cited

U.S. PATENT DOCUMENTS

| | | | |
|---|---|---|---|
| 4,224,473 | 9/1980 | Kaul et al. | 370/505 |
| 4,928,275 | 5/1990 | Moore et al. | 370/506 |
| 5,119,406 | 6/1992 | Kramer | 375/372 |
| 5,132,970 | 7/1992 | Urbansky | 370/506 |
| 5,172,376 | 12/1992 | Chopping et al. | 370/509 |
| 5,343,476 | 8/1994 | Urbansky | 370/506 |
| 5,357,514 | 10/1994 | Yoshida | 370/506 |
| 5,457,717 | 10/1995 | Bellamy | 375/372 |
| 5,497,405 | 3/1996 | Elliot et al. | 375/372 |
| 5,563,891 | 10/1996 | Wang | 370/505 |
| 5,598,445 | 1/1997 | Castano Pinto et al. | 375/372 |
| 5,621,775 | 4/1997 | Etienne | 375/372 |

Primary Examiner—Alpus H. Hsu
Assistant Examiner—Kwang Bin Yao

[57] ABSTRACT

A system and method for frequency recovery that allows selection between either a synchronous recovery scheme or asynchronous recovery. A frequency recovery system for synchronizing a received data stream, comprising: a first timing signal generator configured to receive the data stream, extract any timing information included in the data stream, and output a first timing signal based on the extracted timing information; a clock source for providing a second timing signal; a data module for receiving the data stream and outputting the data stream at a desired rate, the data module utilizing either the first timing signal or the second timing signal to output the data at the desired rate; and a switch for selectively applying either the first timing signal or the second timing signal to the data module.

25 Claims, 4 Drawing Sheets

SYNCHRONOUS AND ASYNCHRONOUS RECOVERY OF SIGNALS IN AN ATM NETWORK

FIELD OF THE INVENTION

This invention relates to the transmission of data and, more specifically, to data transmission in an asynchronous transfer mode network.

BACKGROUND OF THE INVENTION

Traditional transmission of data including, e.g., telephone and video communications, was accomplished in a "synchronous" transmission system. In such a system, the data is transmitted and received at a predetermined rate, with the transmitter and receiver having a predetermined phase relationship and frequency relationship. This type of transmission allows for strict control of delay and delay variation which is important for real time applications such as voice and video. However, synchronous transmission is not efficient for handling bursty data applications such as electronic mail.

As an alternative to synchronous transmission, a more recent transmission method involves encoding digital data streams into short packets or cells. This new data transfer scheme uses a system of priorities, which allows for strict delay and delay variation control for those applications that need it, and supports effectively bursty traffic for those applications that require it. Such a system called an asynchronous transfer mode or "ATM."

When synchronous signals are transported over ATM networks, their periodicity is lost by the statistical nature of multiplexing in the network. As the traffic exits the ATM network, its periodicity is restored by means of a frequency recovery method. There are three common ways of frequency recovery.

The first is called asynchronous frequency recovery and allows a synchronous signal to travel through an ATM network without having its periodicity controlled by the network. There are several implementations of this scheme. The preferred implementation is synchronous residual time stamp ("SRTS"). In an SRTS system, a time stamp is transmitted with the signal and the receiving device uses the time stamp to restore the signal periodicity. SRTS is an asynchronous recovery method.

A further frequency recovery method is "synchronous." Synchronous frequency recovery relies on the frequency stability of the ATM network to restore the periodicity of the synchronous signal.

A third frequency recovery method is known as "hybrid" and consists of a combination of the two methods described above.

SUMMARY OF THE INVENTION

The present invention features a system and method for frequency recovery that allows selection between either a synchronous recovery scheme or an asynchronous recovery.

In one aspect, the invention features a frequency recovery system for resynchronizing a received data stream, comprising: a first timing signal generator configured to receive the data stream, extract any timing information included in the data stream, and output a first timing signal based on the extracted timing information; a clock source for providing a second timing signal; a data module for receiving the data stream and outputting the data stream at a desired rate, the data module utilizing either the first timing signal or the second timing signal to output the data at the desired rate; and a switch for selectively applying either the first timing signal or the second timing signal to the data module.

In preferred embodiments, the first timing signal generator comprises a synchronous residual time stamp receiver and the timing information comprises time stamps included in the data stream. The data module comprises a processor, a memory buffer connected to the processor and a memory buffer control circuit connected to the memory buffer.

The data module may further comprise a parallel to serial converter connected to the output of the memory buffer and a line driver connected to the output of the parallel to serial converter. The memory buffer may be a first in first out buffer.

The switch preferably has two inputs, one of the inputs receiving the first timing signal and the second of the inputs receiving the second timing signal. The switch also preferably receives a control signal, the control signal determining which of the two inputs of the switch is output on an output line of the switch.

The output of the switch may be connected to the parallel to serial converter, the line driver and the memory buffer control circuit.

The memory buffer control circuit may comprise a slip logic unit and an up/down counter.

Furthermore, a microprocessor may be connected to the data module, and may control the output rate of the data module to reduce the amount of data stored by the memory buffer.

In a second aspect, the invention features a method for resynchronizing a received data stream, comprising: receiving the data stream; extracting any timing information included in the received data stream; generating a first timing signal based on the extracted timing information; selecting either the first timing signal or a received clock signal as a data output timing signal; and utilizing the data output timing signal to output the received data stream at a desired rate.

In yet another aspect, the invention features a system for minimizing the average amount of data stored in a data storage device, comprising: a receiver connected to the data storage device for receiving a data stream and storing the data stream in the data storage device; a data output control module for controlling an output rate at which data is output from the data storage device; and a monitoring device for quantitatively monitoring the data stored in the data storage device and outputing a numerical indicator; wherein the data output control module receives the numerical indicator and adjusts the output rate in accordance with the numerical indicator to thereby adjust the average amount of data stored in the data storage device.

The data output control device determines if the amount of data currently being stored by the data storage device is above or below a predetermined desired level, and thereafter adjusts the output rate to bring the amount of data stored in the data storage device closer to the predetermined desired level.

DETAILED DESCRIPTION OF THE PREFERRED EMBODIMENTS

Figure 1:
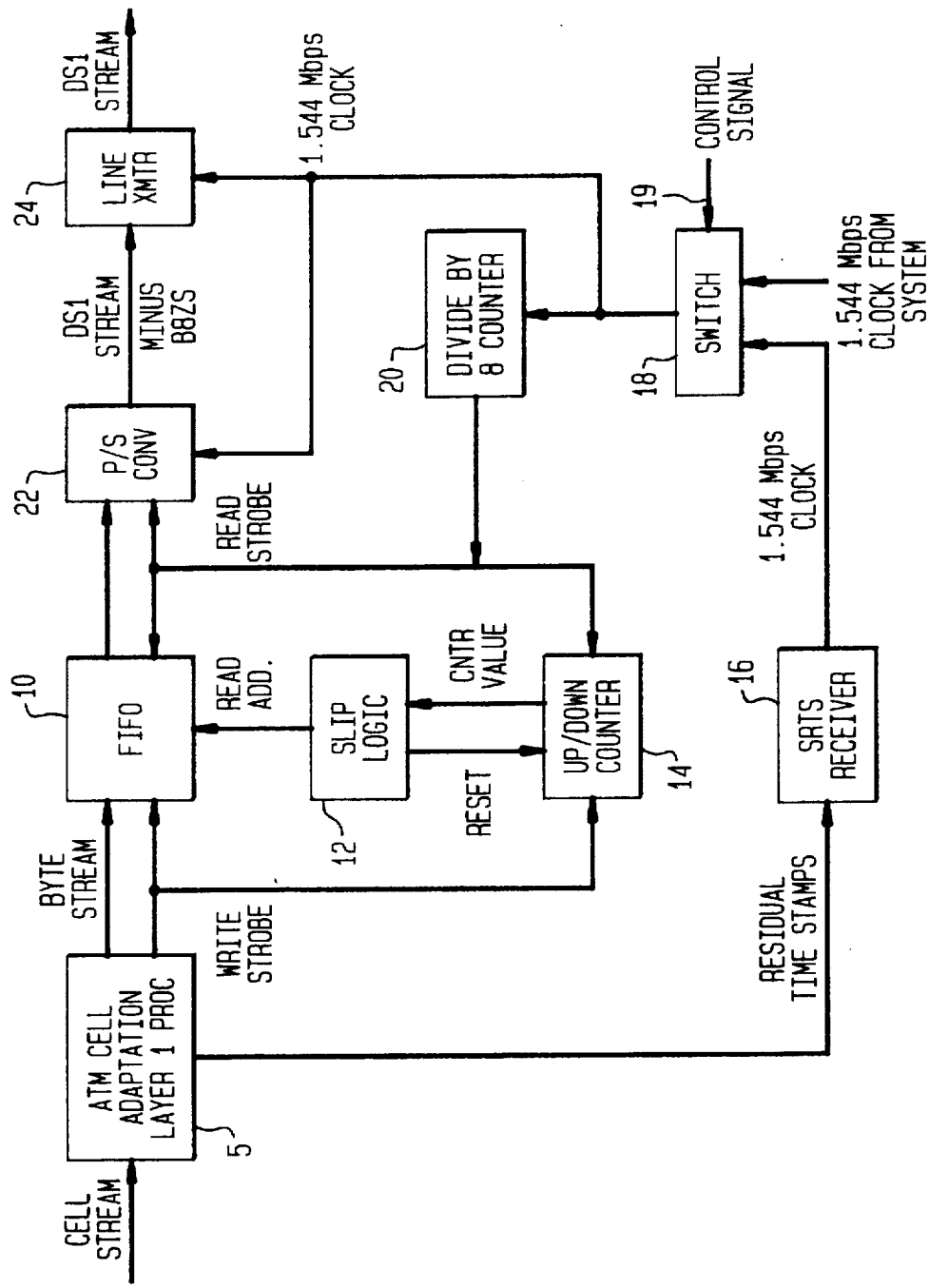
FIG. 1 is a block diagram of a first embodiment of a system according to the present invention.

Referring to FIG. 1, in a first embodiment of the invention an incoming cell stream is received by an ATM cell adaptation layer 1 processor 5 ("AAL1"). The output of AAL1 5 is input to a First In First Out ("FIFO") memory 10, controlled by a FIFO controller made up of slip logic 12 and an up/down counter 14. An SRTS receiver 16 also receives an output of AAL1 5 and outputs via a switch 18 to a divide by 8 counter 20.

The output of FIFO 10 is input to a parallel to serial ("P/S") converter 22, which also receives the output of switch 18. P/S converter 22 outputs to a line driver 24, which also receives the output of switch 18.

In operation, FIFO 10 absorbs the cell delay variation (CDV) introduced by the ATM network into the data stream during transport. The FIFO is capable of absorbing at least 1.3 milliseconds of CDV, which should be enough to satisfy most ATM network scenarios. The FIFO itself will preferably be implemented using a 4096 (512 byte) memory with a fixed write-in position and a variable read-out position. The read-out position will be controlled by an address to be specified by the FIFO controller.

FIFO controller (items 12 and 14 in FIG. 1) is responsible for providing the read address for the FIFO. It will also be responsible for implementing the buffer control strategy consisting of resetting the read address back to the center of the FIFO upon occurrence of a FIFO underflow event (explained below).

Slip logic 12 provides the read address for the FIFO and a reset signal of up/down counter 14. The address will be either the counter value, or 2047 if the counter value is either 0 or 4095. The reset signal will be zero, or it will be one when the counter value is either 0 or 4095. Up-down counter 14 should be capable of counting up to 4095, and should allow resetting to a pre-determined value (2047).

SRTS receiver 16 is responsible for providing the clock signal to read data from the FIFO if asynchronous DS1 circuit emulation is desired (and therefore selected at switch 18). ("DS1" is a standard digital format for a signal operating at a rate of 1.544 Mbps.) SRTS receiver 16 will interpret the SRTS time stamps received from the AAL1 processor 5. After doing its processing, SRTS receiver 16 outputs a 1.544 Mbps signal.

In operation, switch 16 will allow selection of the frequency recovery method to be used via a control signal input on line 19. One option will allow the SRTS clock signal to pass, therefore supporting asynchronous transport. The other option will be for the switch to allow the system clock signal to pass, therefore supporting synchronous frequency recovery. Thus, switch 18 is used to select between a 1.544 Mbps signal generated by the SRTS receiver or a 1.544 Mbps signal traceable to the host system clock. The assumption is that the host system clock is being externally timed by a stratum 1 traceable source.

The P/S convertor 22 is used to transform the signal from an eight bit parallel bus to a serial stream of bits. This conversion is necessary because the FIFO and the FIFO controller handle eight bits (a byte) at a time, and the line driver 24 requires a serial stream of bits as input.

The line driver 24 is responsible for converting the serial bit stream into a standard interface (e.g., DS1). The functions of the line driver include B8ZS character substitution and signal level conversion. B8ZS replaces 8 consecutive zeros with a special symbol. This replacement is done to maintain a certain density of ones in the digital signal. Ones density is important for the proper operation of signal regenerators.

Divide by 8 counter 22 is responsible for transforming a 1.544 Mbit per second clock signal into a 193 kbytes per second clock signal. The transformation is necessary in the preferred embodiment because the FIFO and the Up/down counter (unlike the line driver) operate at the byte level.

The AAL1 processor 5 will perform all standard AAL1 functions except frequency recovery. Some of those functions include: removal of cell overhead, data re-assembly; and end to end error correction, etc.

Figure 2:
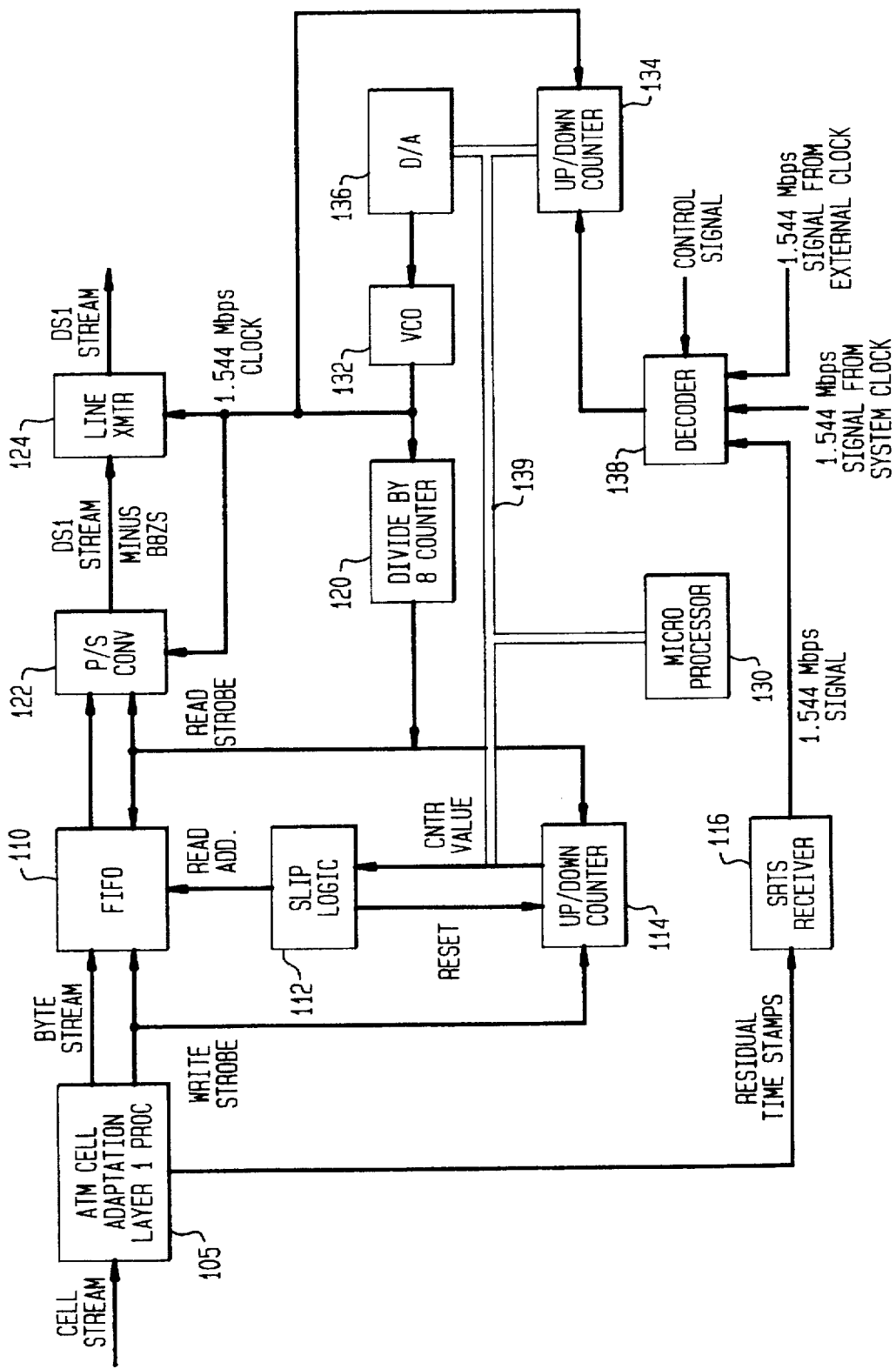
FIG. 2 is a block diagram of a second embodiment of a system according to the present invention.

Referring to FIG. 2, a second, alternative embodiment of the invention is shown and includes AAL1 processor 105, FIFO 110, slip logic 112, up/down counter 114, SRTS receiver 116, P/S converter 122, line driver 124, and divide by 8 counter 120. These components are similar to the corresponding components shown in FIG. 1.

The embodiment of FIG. 2 further features microprocessor 130, a voltage controlled oscillator ("VCO") 132, up/down counter 134, digital to analog ("D/A") converter 136 and decoder 138.

Microprocessor 130 measures the status of counters 114, 134 and processes and applies corrections to the output frequency of VCO 132 via D/A converter 136. The filter characteristics of both loops (see FIG. 3, explained below) will be digitally implemented, and they will reside in the microprocessor. Microprocessor 130 is connected to up/down counters 114, 134 and D/A converter 136 via digital bus 139.

The D/A converter 136 will be used to convert digital signals from the microprocessor into analog voltage levels that the VCO will understand.

The VCO 132 will generate the frequency at which data will be read out of the FIFO 110. The VCO frequency will be controlled through the microprocessor to closely follow the frequency reference selected in the decoder. The selected frequency sources include a signal from SRTS receiver 116, a signal from the system clock and a signal from an external clock. An external clock signal can be more reliable than a system clock. A frequency correction may also be applied to the VCO based on the FIFO fill level according to the logic described in FIG. 4 below.

The up/down counter 134 will be used to measure the difference between the output frequency and the frequency reference.

Figure 3:
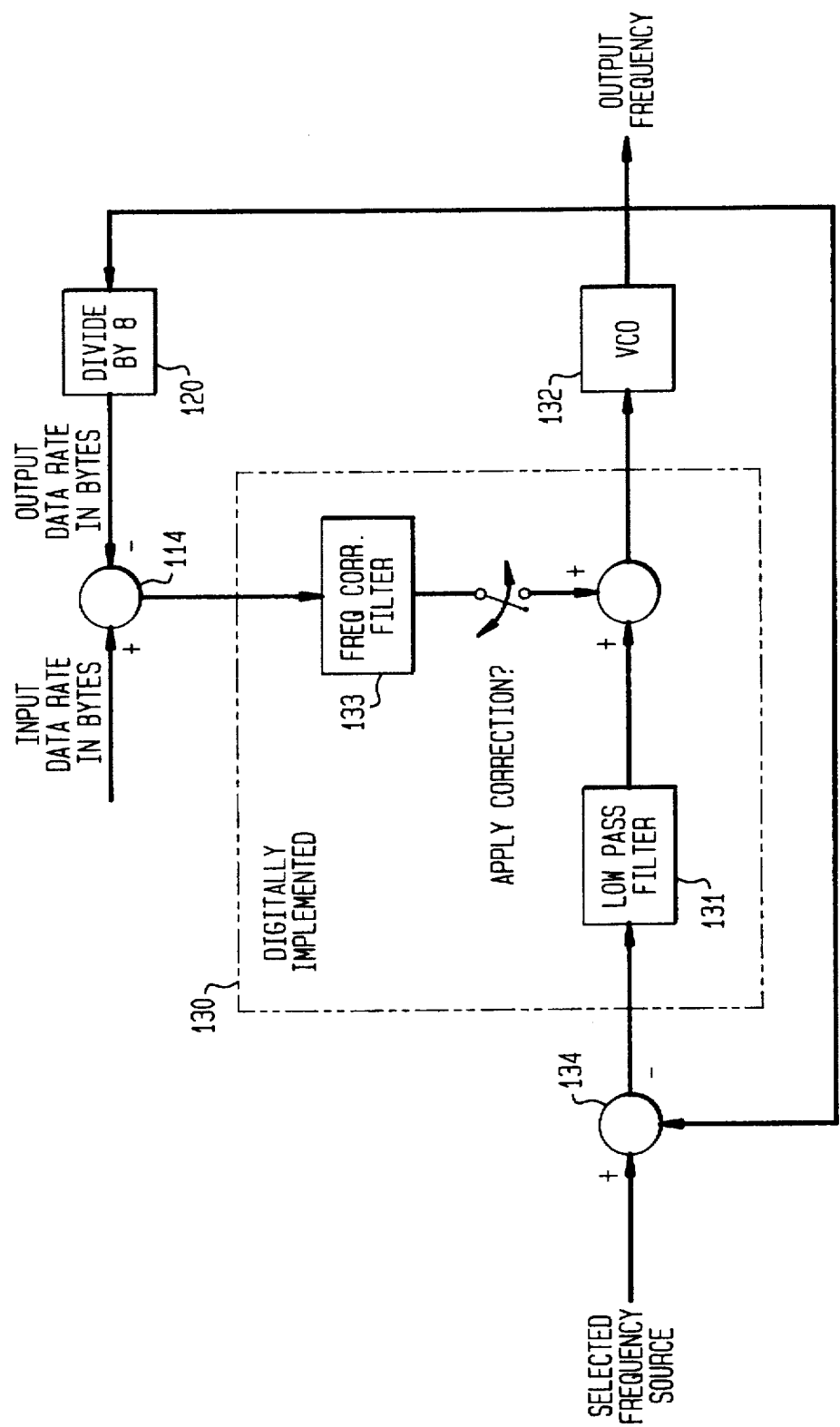
FIG. 3 is a functional block diagram of the system shown in FIG. 2.

FIG. 3 is a functional block diagram illustrating the functions performed by the system of FIG. 2. The selected frequency source is input to up/down counter 134 (represented by a circle in FIG. 3) which also receives as an input the output of VCO 132. The up/down counter then outputs a signal that is indicative of the difference between these signals. In other words, up/down counter 132 looks at the desired frequency and the actual frequency output by the VCO and outputs a signal that indicates how far the actual frequency is above or below the desired frequency.

This output of up/down counter 134 is filtered by a low pass filter 131 that is implemented by microprocessor 130 (to filter out any spikes in the VCO output). The microprocessor also receives the output of up/down counter 114, which determines the difference between the data input and output rates of FIFO 110.

A frequency correction filter 133 (also implemented by microprocessor 130) determines any desired change in frequency as a result of the status of FIFO 110. It is important that FIFO 110 output data at about the same rate that it receives data. Otherwise, the FIFO will either empty (commonly called "starvation") or will overflow.

Thus, microprocessor 130 receives the outputs of up/down counters 134 and 114 and, based on these outputs, determines the appropriate adjustment to be supplied to the VCO 132 via D/A converter 136.

Figure 4:
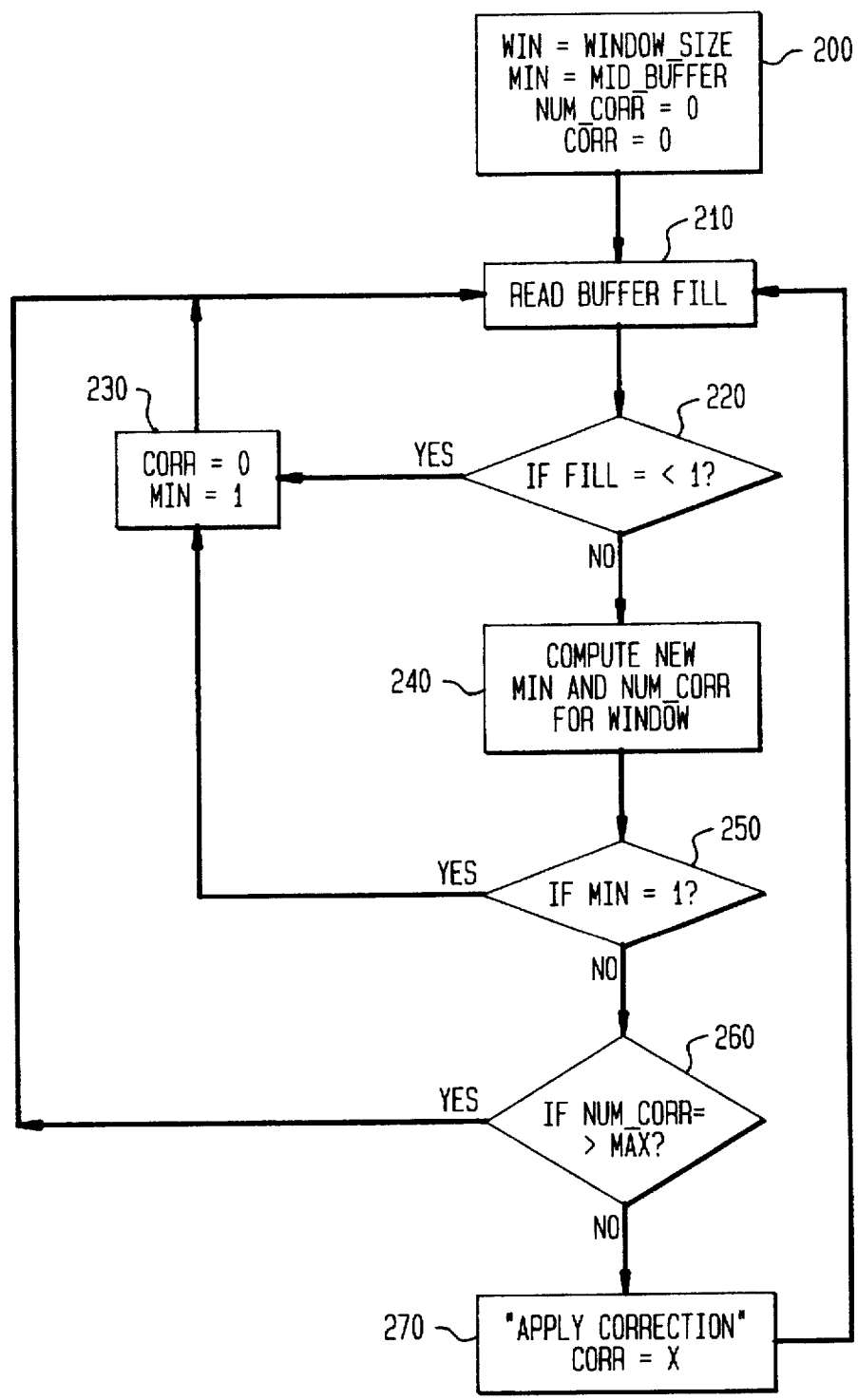
FIG. 4 is a flow chart illustrating the operation of a portion of the embodiment shown in FIG. 2.

FIG. 4 illustrates a FIFO control process that is preferably implemented by the embodiment of FIG. 2 to maximize the efficient use of FIFO 110 (i.e., the higher the FIFO "fill" level, the more delay the system will experience in reading data out of the FIFO). Thus, it is desirable to reduce the fill level of the FIFO as close to zero as possible.

In the preferred process of FIG. 4, certain parameters are initialized at step 200. Specifically, "WIN" or window size is determined, typically half of the FIFO capacity. The window size is the size of the normal variation in the buffer/fill level during operation of the system For example, considering a 512 byte FIFO, WIN is set at 256. Thus, the fill will vary within a window of 256 bytes during operation.

Next, the initial position of the window is determined. A parameter "MIN" is established, which is the minimum fill value of the window. MIN is initially set at the middle of the buffer (i.e., at 256). "COR" is initialized to zero, and represents the correction to be applied to the MIN. This is the value by which the MIN will be decreased at a given time. As noted above, the object of the process is to keep MIN as close to zero as possible.

The parameter "NUM CORR" is also set to zero, and reflects the number of corrections applied to MIN within the previous twenty-four hour period. It is preferable to limit the number of times corrections are applied to MIN.

After initialization, the system, at step 210, will read the current value of the buffer fill. If the buffer fill is less than or equal to one (indicating that the buffer is nearly empty) then no changes are warranted and the yes result (at step 220) causes the system to transition to step 230 where CORR is set to zero and MIN=1. Note that when the fill is less than one, MIN must be equal to one.

If, at step 220, the fill level is greater than one, then an adjustment to MIN may be warranted. Thus, at step 240, a new target MIN is determined and a NUM CORR is calculated. (This is the number of corrections that have been applied during a previous predetermined time period, e.g., 24 hours).

Then, at step 250 the MIN is tested to see if it is equal to one and, if it is, the system transitions to step 230.

If the MIN is not equal to one at step 250, then the NUM CORR parameter is tested at step 260 to see if it is equal to or greater than the maximum specified number. If it is, then the system transitions to step 210.

However, if the MIN is greater than one and if NUM CORR is not yet at the maximum, then a correction (represented by x) is applied at step 270 to the output of the VCO to effectively shift the window in the FIFO and push MIN toward the target. After step 270, the system returns to step 210.

It should be understood that the above is merely an illustrative description of the best mode of practicing the invention and that many modifications and variations are possible without departing from the spirit of the invention or the scope of the appended claims.

I claim:

1. A timing recovery system for resynchronizing a received data stream, comprising:

a first timing signal generator configured to receive said data stream, extract any timing information included in said data stream, and output a first timing signal based on said extracted timing information;

a clock source for providing a second timing signal;

a data module for receiving said data stream and outputting said data stream at a desired rate, said data module utilizing either said first timing signal or said second timing signal to output said data at said desired rate; and a switch for selectively applying either said first timing signal or said second timing signal to said data module.

2. The system of claim 1 wherein said first timing signal generator comprises a synchronous residual time stamp receiver and said timing information comprises time stamps included in said data stream.

3. The system of claim 1 wherein said data module comprises a processor, a memory buffer connected to said processor and a memory buffer control circuit connected to said memory buffer.

4. The system of claim 3 wherein said data module further comprises a parallel to serial converter connected to the output of said memory buffer and a line driver connected to the output of said parallel to serial converter.

5. The system of claim 4 wherein said memory buffer is a first in first out buffer.

6. The system of claim 1 wherein said switch has two inputs, one of said inputs receiving said first timing signal and the second of said inputs receiving said second timing signal, and wherein said switch receives a control signal, said control signal determining which of said two inputs of said switch is output on an output line of said switch.

7. The system of claim 5 wherein said output of said switch is connected to said parallel to serial converter, said line driver and said memory buffer control circuit.

8. The system of claim 5 wherein said memory buffer control circuit comprises a slip logic unit and an up/down counter.

9. The system of claim 3 further comprising a microprocessor connected to said data module.

10. The system of claim 9 wherein said microprocessor controls the output rate of said data module to reduce the amount of data stored by said memory buffer.

11. A method for resynchronizing a received data stream, comprising:

receiving said data stream;

extracting any timing information included in said received data stream;

generating a first timing signal based on said extracted timing information;

selecting either said first timing signal or a clock signal as a data output timing signal; and utilizing said data output timing signal to output said received data stream at a desired rate.

12. The method of claim 11 wherein said first timing signal is generated using a synchronous residual time stamp receiver and said timing information comprises time stamps included in said data stream.

13. The system of claim 11 wherein said utilizing step is carried out using a processor, a memory buffer connected to said processor and a memory buffer control circuit connected to said memory buffer.

14. The system of claim 13 wherein a parallel to serial converter connected to the output of said memory buffer and a line driver connected to the output of said parallel to serial converter.

15. The system of claim 14 wherein said memory buffer is a first in first out buffer.

16. The system of claim 11 wherein said selecting step is carried out using a switch.

17. The system of claim 15 wherein an output of said switch is connected to said parallel to serial converter, said line driver and said memory buffer control circuit.

18. The system of claim 15 wherein said memory buffer control circuit comprises a slip logic unit and an up/down counter.

19. The system of claim 13 further comprising the step of controlling the output rate of said memory buffer to reduce the amount of data stored by said memory buffer.

20. A system for minimizing the average amount of data stored in a data storage device, comprising:
- a receiver connected to said data storage device for receiving a data stream and storing said data stream in said data storage device;
- a data output control module for controlling an output rate at which data is output from said data storage device; and
- a monitoring device for quantitatively monitoring the data stored in said data storage device and outputting a numerical indicator representative of the amount of data stored in said data storage device;

wherein said data output control module receives said numerical indicator and adjusts said output rate in accordance with said numerical indicator to reduce said amount of data stored in said data storage device until said storage device is approximately empty.

21. The system of claim 20 wherein said data output control module determines if the amount of data currently being stored by said data storage device is above or below a predetermined desired level, and thereafter adjusts said output rate to bring the amount of data stored in said data storage device closer to said predetermined desired level.

22. The system of claim 20 wherein said data ouput control module comprises a microprocessor.

23. The system of claim 20 wherein said data storage device comprises a first in first out buffer.

24. The system of claim 20 wherein said monitoring device comprises a slip logic unit and an up/down counter.

25. The system of claim 20 wherein said numerical indicator indicates the average amount of data stored in said data storage device.

* * * * *